G. R. STURGIS.
POWER TRANSMISSION.
APPLICATION FILED FEB. 20, 1917.
1,276,438.
Patented Aug. 20, 1918.
2 SHEETS—SHEET 2.
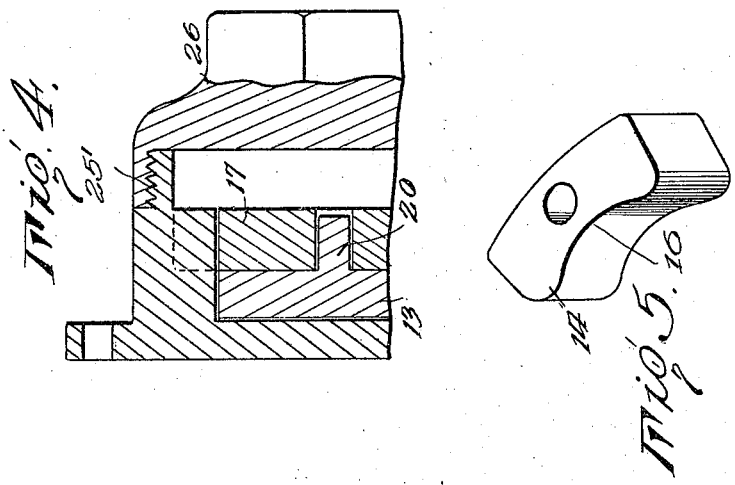
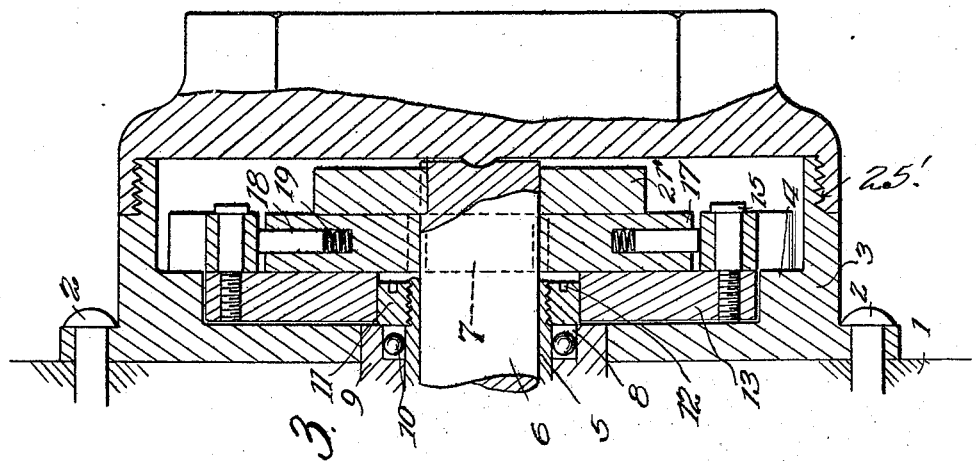
Gordon R. Sturgis
Inventor
By Geo. P. Kimmel
Attorney

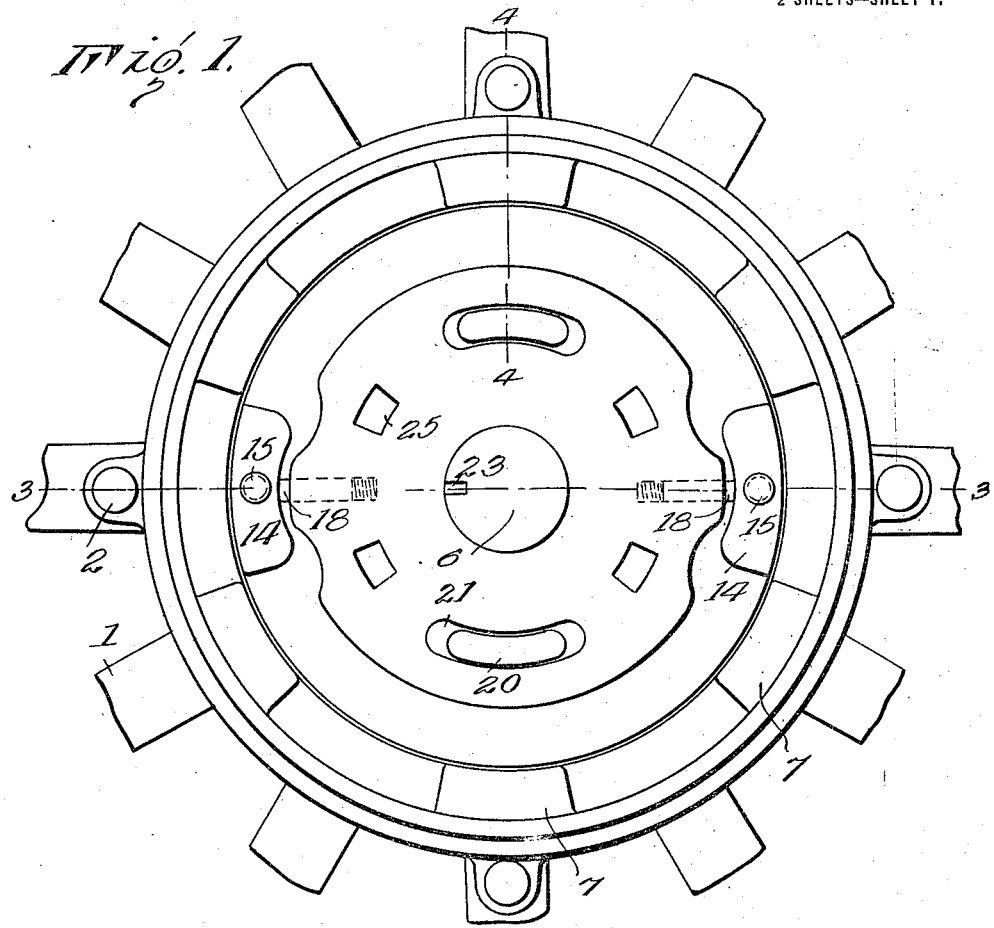
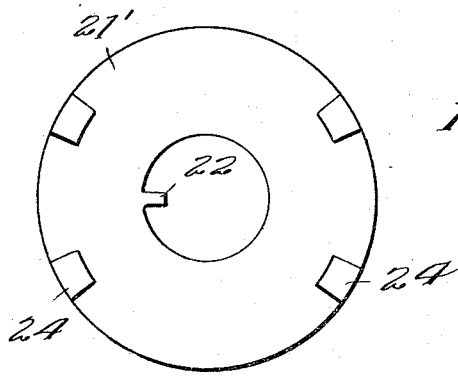

UNITED STATES PATENT OFFICE.

GORDON R. STURGIS, OF HILLSBORO, TEXAS.

POWER TRANSMISSION.

1,276,438.            Specification of Letters Patent.     Patented Aug. 20, 1918.

Application filed February 20, 1917.  Serial No. 149,889.

*To all whom it may concern:*

Be it known that I, GORDON R. STURGIS, a citizen of the United States, and resident of Hillsboro, in the county of Hill and State of Texas, have invented certain new and useful Improvements in Power Transmissions, of which the following is a specification.

The present invention relates to a device adapted to be associated with the driving wheels of a vehicle and having connection with the driving shaft thereof to transmit the desired motion.

The primary object of my invention is to provide a device of the character mentioned that will avoid the necessity for the use of a complicated differential mechanism now in use.

A still further object of my invention is to provide a device of the class described in which the parts thereof are closely assembled and combined, thereby taking up a minimum amount of space, and rendering the device especially applicable for operation in connection with automobiles.

Other improvements and novel details in the construction and operation of the various parts of the apparatus will be brought out more in detail in the description to follow, which, for a clear understanding of the invention, should be considered in connection with the accompanying drawing, forming a part hereof, and wherein is disclosed, for the purpose of illustration, convenient and satisfactory embodiments of the invention. It is to be noted, in this connection, that minor changes in the construction and arrangement of the parts may be made without departing from the spirit of the invention or the principle of operation of the various parts.

In the drawings:

Figure 1 is a side elevation of my invention attached to a wheel, the same being shown fragmental;

Fig. 2 is a side elevation of a disk plate used in connection with my invention;

Fig. 3 is a longitudinal sectional view taken on the line 3—3 of Fig. 1;

Fig. 4 is a fragmentary sectional view on the line 4—4 of Fig. 1, and

Fig. 5 is a perspective view of the pawl member used in connection with my invention.

Corresponding and like parts are referred to in the following description and indicated in all the views of the drawings by the same reference characters.

My improved power transmitting device is shown as secured to the drum of a wheel designated 1 by means of bolts 2.

The transmitting device of my invention comprises a body portion 3 of a circular configuration and provided with an annular flange 4. An opening 5 is provided within said body portion to receive the shaft member 6 which it is to be noted is the driving means used in connection with my invention. A plurality of radially extending lug members 7 are provided on the circular flange, for a purpose which will hereinafter appear. A bearing race 8 is provided within the body portion by means of a collar 9 that forms the necessary opening to receive the ball bearings 10.

The bearings are retained in the desired position by means of a thimble nut 11 provided with the necessary opening 12 to permit the loosening of the same by means of a spanner wrench.

The driving disk 13 of my invention is rotatably mounted about the thimble nut 11 and the upper surface thereof being in alinement with the annular flange 4. A plurality of openings are provided adjacent the peripheral edge of the driving disk forming means for pivotally engaging the pawl members 14 by means of the screws 15 or other suitable securing means. The pawl members 14 are substantially arcuate shaped and are recessed as at 16, for a purpose which will be hereinafter described.

The ratchet plate 17 is rotatably mounted upon the shaft member 6 provided with radially extending recesses adapted to receive pin members 18, the free ends of which being adapted to engage the recessed portions 16 of the pawl members. A coil spring 19 is mounted within the opening to give the desired pressure to the pin members 18. The driving disk 13 is provided with a plurality of lateral extensions 20 adapted to engage the elongated arcuate openings 21 provided in the ratchet disk forming the desired means necessary for limiting the opposite relative movement of the ratchet plate with the driving disk. A disk 21' is keyed to the shaft member by means of a projection 22 formed thereon adapted to engage the longitudinally extending slot 23 provided in the shaft. Projections 24 are provided on the disk member adjacent the peripheral edge thereof and adapted to engage squared openings 25 provided in the ratchet plate to impart the desired motion of the shaft thereto.

The upper edge of the body 3 is reduced and threaded as at 25' to receive the tapered cap portion 26 which is also threaded. It is obvious that upon the rotation of the shaft the movement thereof will be transmitted to the disk 21' and from there by means of the extensions and lugs 24 to the ratchet plate which in turn transmits the motion to the driving disk by means of the projections 20. It is to be noted that upon rotation of the ratchet plate, the pins 18 engaging the recessed portions 16 of the pawls will cause pivotal movement of the pawls and thereby cause the same to engage the adjacent lug members and as a consequence, form a positive lock or connection to permit the transmission of power to the wheel. It is apparent that the elongated slots 21 are provided merely to limit the desired opposite relative movement of the ratchet plate and the driving disk in order that the pawls can be disengaged from the pins 18.

From the foregoing, it will be understood by those skilled in the art that I have provided an exceedingly simple and effectual form of automatic clutch which can be advantageously used in connection with the transmission of power in motor driven vehicles; the rotation of the axle serving to automatically connect the wheels thereto by means of the clutch, when the proper speed ratio has been established through the usual form of variable speed gearing commonly employed.

I claim:

The combination with a driving shaft and a wheel member rotatably mounted thereon, of a body portion, an annular flange formed within said body, lugs mounted on said flange, a driving disk having projections extending therefrom, pawl members pivotally connected to the driving disk adapted to engage said lugs, a ratchet plate having elongated slots therein engaged by said projection to limit the relative opposite movement of the ratchet plate and driving disk, pin members slidably mounted in the ratchet disk engaging the pawls; a disk keyed to said shaft, and means associated with the last mentioned disk to transmit motion to the ratchet plate for a purpose specified.

In testimony whereof, I affix my signature hereto.

GORDON R. STURGIS.

Copies of this patent may be obtained for five cents each, by addressing the "Commissioner of Patents, Washington, D. C."